US009692224B2

(12) United States Patent
Louco et al.

(10) Patent No.: US 9,692,224 B2
(45) Date of Patent: Jun. 27, 2017

(54) POWER DISTRIBUTION SYSTEMS AND METHODS OF MONITORING ZONE SELECTIVE INTERLOCKING IN A POWER DISTRIBUTION SYSTEM

(71) Applicant: General Electric Company, Schenectady, NY (US)

(72) Inventors: Lathom Alexander Louco, Louisville, KY (US); John James Dougherty, Newton, PA (US); Craig Benjamin Williams, Louisville, KY (US)

(73) Assignee: General Electric Company, Schenectady, NY (US)

( * ) Notice: Subject to any disclaimer, the term of this patent is extended or adjusted under 35 U.S.C. 154(b) by 95 days.

(21) Appl. No.: 14/739,696

(22) Filed: Jun. 15, 2015

(65) Prior Publication Data

US 2016/0365719 A1  Dec. 15, 2016

(51) Int. Cl.
*H02H 3/00* (2006.01)
*H02H 3/08* (2006.01)
*H02H 7/30* (2006.01)
*H02H 1/00* (2006.01)
*H04L 12/10* (2006.01)
(Continued)

(52) U.S. Cl.
CPC ............ *H02H 3/08* (2013.01); *H02H 1/0084* (2013.01); *H02H 7/30* (2013.01); *H04L 12/10* (2013.01); *H04L 12/40006* (2013.01); *H02H 3/05* (2013.01); *H02H 7/261* (2013.01); *H02H 7/262* (2013.01); *H02J 13/00* (2013.01); *H04L 12/00* (2013.01)

(58) Field of Classification Search
USPC ...................................................... 361/62–69
See application file for complete search history.

(56) References Cited

U.S. PATENT DOCUMENTS 6,297,939 B1  10/2001  Bilac et al.
6,313,975 B1  11/2001  Dunne et al.
(Continued)

FOREIGN PATENT DOCUMENTS

DE  102010036211 A1  3/2012
DE  102014114994 A1  4/2015

OTHER PUBLICATIONS

Eaton, Cutler-Hammer, "Zone Interlocking Application Note," Aug. 2003, 33 pages.
(Continued)

*Primary Examiner* — Danny Nguyen
(74) *Attorney, Agent, or Firm* — General Electric Company (57) ABSTRACT

Power distribution systems and methods are described. In one example, a method of testing a power distribution system including a first circuit protection device and a second circuit protection device coupled to the first circuit protection device downstream of the first circuit protection device is described. The method includes monitoring a status of a communicative connection between a ZSI output port of the first circuit protection device and a ZSI input port of the second circuit protection device with a ZSI monitor of the first circuit protection device, detecting whether the ZSI output port of the first circuit protection device is coupled to the ZSI input port of the second circuit protection device, and indicating the status of the communicative connection.

20 Claims, 5 Drawing Sheets (51) Int. Cl.
    *H04L 12/40*     (2006.01)
    *H02H 3/05*     (2006.01)
    *H02H 7/26*     (2006.01)
    *H02J 13/00*     (2006.01)
    *H04L 12/00*     (2006.01)

(56) References Cited

U.S. PATENT DOCUMENTS

| | | |
|---|---|---|
| 6,356,422 B1 | 3/2002 | Bilac et al. |
| 7,570,471 B2 | 8/2009 | Weiher et al. |
| 7,747,354 B2 | 6/2010 | Papallo et al. |
| 7,889,474 B2 | 2/2011 | Weiher et al. |
| 8,521,454 B2 | 8/2013 | Lagree |
| 2008/0198521 A1* | 8/2008 | Weiher .................. H02H 7/262 361/64 |
| 2010/0164503 A1 | 7/2010 | Sawhney et al. |
| 2014/0071569 A1 | 3/2014 | Liptak et al. |
| 2014/0072569 A1 | 3/2014 | Braun et al. |
| 2014/0247528 A1 | 9/2014 | Chen et al. |
| 2015/0116877 A1 | 4/2015 | Singh et al. |
| 2015/0200538 A1* | 7/2015 | Chen ....................... H02H 7/30 361/64 |

OTHER PUBLICATIONS

European Search Report and Opinion issued in connection with corresponding EP Application No. 16174146.7 on Dec. 16, 2016.

\* cited by examiner

POWER DISTRIBUTION SYSTEMS AND METHODS OF MONITORING ZONE SELECTIVE INTERLOCKING IN A POWER DISTRIBUTION SYSTEM

BACKGROUND OF THE INVENTION

The present application relates generally to power systems and, more particularly, to power distribution systems and methods of monitoring zone selective interlocking in a power distribution system.

Known electrical distribution systems include a plurality of switchgear lineups including circuit breakers that are each coupled to one or more loads. The circuit breakers typically include a trip unit that controls the circuit breakers based upon sensed current flowing through the circuit breakers. More specifically, the trip unit causes current flowing through the circuit breaker to be interrupted if the current is outside of acceptable conditions.

For example, at least some known circuit breakers are programmed with one or more current thresholds (also known as "pickup" thresholds) that identify undesired current levels for the circuit breaker. If a fault draws current in excess of one or more current thresholds for a predetermined amount of time, for example, the trip unit typically activates the associated circuit breaker to stop current from flowing through the circuit breaker. However, in power distribution systems that include a plurality of circuit breakers, a typical arrangement uses a hierarchy of circuit breakers. Large circuit breakers (i.e., circuit breakers with a high current rating) are positioned closer to a power source than lower current feeder circuit breakers and feed the lower current feeder circuit breakers. Each feeder circuit breaker may feed a plurality of other circuit breakers, which connect to loads or other distribution equipment.

A fault may occur anywhere in the circuit breaker hierarchy. When a fault occurs, each circuit breaker that has the same fault current flowing through it may detect different amounts of fault current as a result of varying sensor sensitivities and/or tolerances. When the fault occurs, the circuit breaker closest to the fault should operate to stop current from flowing through the circuit breaker. If a circuit breaker higher in the hierarchy trips, multiple circuits or loads may unnecessarily lose service.

To accommodate for the varying tolerances and to ensure that multiple circuit breakers do not unnecessarily trip based on the same fault current, the current thresholds of at least some known circuit breakers are nested with each other to avoid overlapping fault current thresholds. In some other known systems, circuit breakers in a lower tier send coordination or blocking signals to higher tier circuit breakers upon detection of a fault current. The upper tier circuit breakers' operation is coordinated with the operation of the lower tier circuit breaker in response to the blocking signal. When a communication failure (such as a broken or disconnected connection/wire) between the lower tier circuit breaker and the higher tier circuit breaker occurs in such systems, the higher tier circuit breaker may remain unaware that the lower tier circuit breaker has detected a fault and unnecessary nuisance trips of the higher tier circuit breaker are more likely.

BRIEF DESCRIPTION OF THE INVENTION

In one aspect, a circuit protection device is described. The circuit protection device includes a trip mechanism to interrupt a current flowing through the circuit protection device and a trip unit operatively coupled to the trip mechanism. The trip unit includes a zone selective interlocking (ZSI) signal generator, a ZSI output port, and a ZSI monitor. The ZSI output port is coupled to the ZSI signal generator for communicative connection to a ZSI input port of a second circuit protection device. The ZSI monitor is coupled to the ZSI signal output port to monitor a status of the communicative connection between the ZSI output port and the ZSI input port of the second circuit protection device.

In another aspect, a power distribution system including a first circuit protection device and a second circuit protection device is described. The first circuit protection device includes a ZSI input port. The second circuit protection device is coupled to the first circuit protection device downstream of the first circuit protection device. The second circuit protection device includes a trip mechanism to interrupt a current flowing through said circuit protection device and a trip unit coupled to the trip mechanism. The trip unit includes a ZSI signal generator, a ZSI output port, and a ZSI monitor. The ZSI output port is coupled to the ZSI signal generator and communicatively connected to the ZSI input port of the first circuit protection device. The ZSI monitor is coupled to the ZSI output port to monitor a status of the communicative connection between the ZSI output port and the ZSI input port of the first circuit protection device.

In yet another aspect, a method of monitoring a power distribution system with a plurality of circuit protection devices including a trip unit with ZSI is described. The method includes monitoring a status of a communicative connection between a ZSI output port of a first circuit protection device and a ZSI input port of a second circuit protection device with a ZSI monitor of the first circuit protection device. The method further includes detecting whether the ZSI output port of the first circuit protection device is coupled to the ZSI input port of the second circuit protection device and indicating the status of the communicative connection.

DETAILED DESCRIPTION OF THE INVENTION

Exemplary embodiments of power distribution systems and methods of operating and/or testing a power distribution system are described herein. The exemplary power distribution systems include a plurality of circuit protection devices arranged in a plurality of tiers in a zone selective interlocking (ZSI) configuration. One or more downstream (e.g., in a lower tier) circuit protection devices are operable to output a blocking signal to one or more upstream (e.g., in a higher tier) circuit protection devices. The downstream circuit protection devices include a ZSI signal generator to output the blocking signal and a ZSI monitor coupled to the output of the downstream circuit protection device to selectively monitor the status of the ZSI signal generator and the connection between the upstream and downstream circuit protection devices. If the ZSI monitor determines the ZSI signal generator and/or the connection between the circuit protection devices may not be functioning properly, the ZSI monitor generates a status indicator to notify a user of the potential maintenance issues. The example embodiments thus simplify installation and/or maintenance of power distribution systems by self-monitoring the configuration and functionality of a ZSI network without interrupting the ZSI network.

Figure 1:
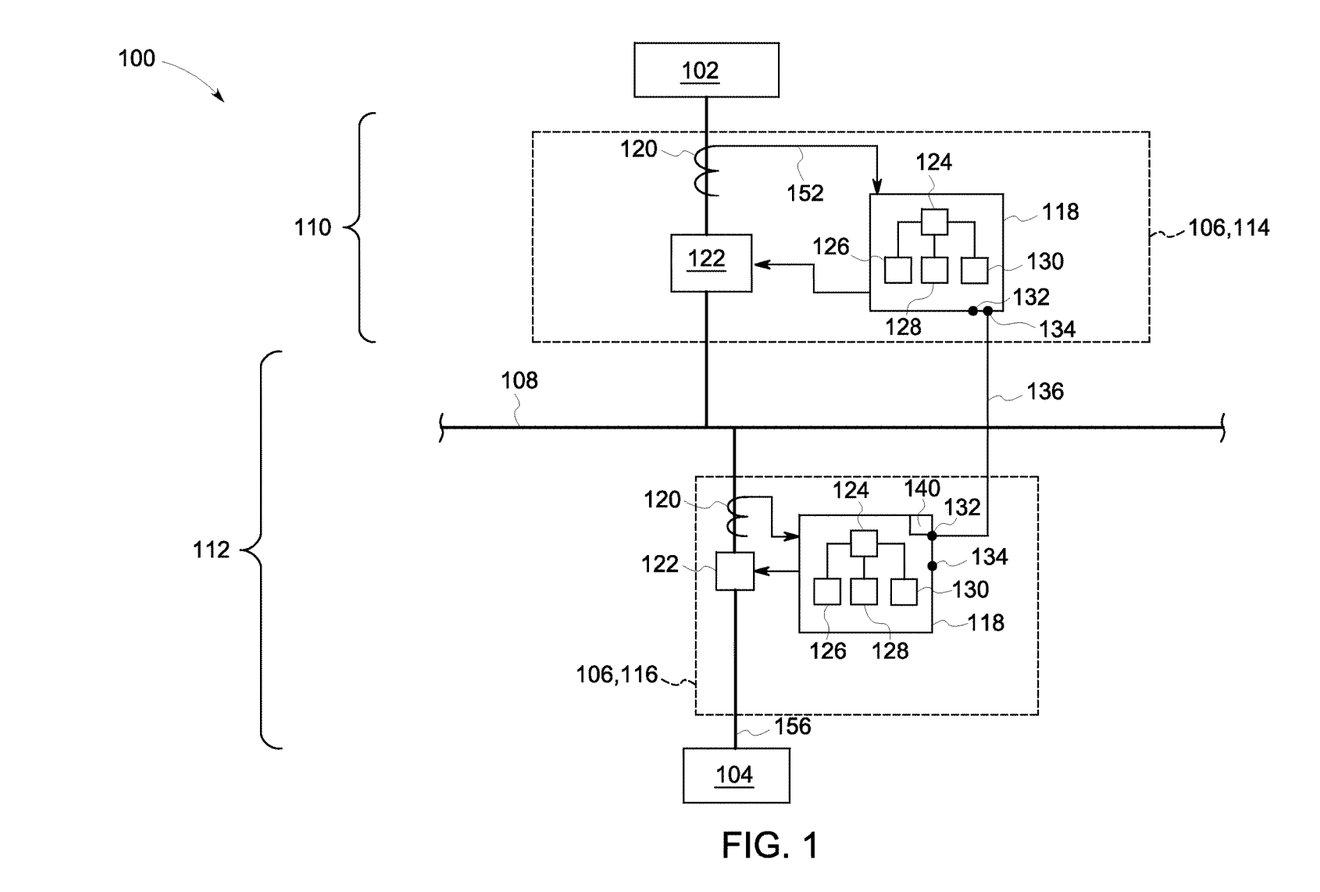
FIG. 1 is a schematic block diagram of an exemplary power distribution system.

FIG. 1 is a schematic block diagram of a portion of an exemplary power distribution system 100 including a source 102 providing power to a load 104 via circuit protection devices 106. Electrical power source 102 may include, for example, one or more generators or other devices that provide electrical current (and resulting electrical power) to load 104. The electrical current is transmitted to loads 104 through distribution bus 108. Load 104 may include, but is not limited to only including, machinery, motors, lighting, and/or other electrical and mechanical equipment of a manufacturing or power generation or distribution facility.

In the illustrated embodiment, circuit protection devices 106 are arranged in a hierarchy including a first tier 110 and a second tier 112 to provide different levels of protection and monitoring to power distribution system 100. For example, a first circuit protection device 114 (sometimes referred to as a source circuit protection device) is arranged in first tier 110 to receive current from a first electrical power source 102 and provide current to bus 108. A second circuit protection device 116 (sometimes referred to as a feeder circuit protections device) is arranged in the second tier 112 downstream of first circuit protection device 114 and connected to receive current from bus 108. Second circuit protection device 116 provides current to load 104. As used herein, the term "downstream" refers to a direction from electrical power source 102 towards load 104. The term "upstream" refers to a direction opposite the downstream direction, for example, from load 104 towards electrical power source 102. While FIG. 1 illustrates circuit protection devices 106 arranged in two tiers 110 and 112, it should be recognized that any suitable number of circuit protection devices 106 may be arranged in any suitable number of tiers to enable power distribution system 100 to function as described herein. For example, it should be recognized that one or more additional tiers and/or circuit protection devices 106 may be disposed between electrical power source 102 and first tier 110 in some embodiments. Additionally or alternatively, one or more additional tiers and/or circuit protection devices 106 may be disposed between load 104 and second tier 112 circuit protection devices 106 in some embodiments. Moreover, one or more additional circuit protection devices 106 may be disposed to provide power (from any suitable source 102) to bus 108. Similarly, one or more additional circuit protection devices may be connected to bus 108 to provide power to one or more additional loads 104.

In the exemplary embodiment, circuit protection devices 106 are circuit breakers. Alternatively, circuit protection devices 106 may be any other device that enables power distribution system 100 to function as described herein. In an exemplary embodiment, each circuit protection device 106 has an integrated trip unit including a controller configured to control operation of circuit protection device 106. Alternatively, one or more of circuit protection devices 106 may be non-integrated circuit protection devices 106 with separate components and/or controller(s). Circuit protection devices 106 include a trip unit 118 operatively coupled to a sensor 120 and a trip mechanism 122. Trip unit 118 is a controller configured to control operation of circuit protection device 106. Trip unit 118, in an exemplary embodiment, is an electronic trip unit (ETU) that includes a processor 124 coupled to a memory 126, an input device 128, and a display device 130. Trip unit 118 may include, or may be considered to be, a computing device. In other embodiments, trip units 118 may be any other suitable type of trip unit. In some embodiments, one or more of circuit protection devices 106 include a different type of trip unit 118 and/or is a different type of circuit protection device than at least one other of circuit protection devices 106. In some embodiments, circuit protection devices 106 do not include trip units 118, and the functions described herein as being performed by trip unit 118 are instead performed by a central controller or a standalone protective relay (not shown).

Sensor 120, in an exemplary embodiment, is a current sensor, such as a current transformer, a Rogowski coil, a Hall-effect sensor, and/or a shunt that measures a current flowing through trip mechanism 122 and/or circuit protection device 106. Alternatively, sensor 120 may include any other sensor that enables power distribution system 100 to function as described herein. Moreover, sensor 120 may be integrated in a circuit protection device 106 or may be separate from an associated circuit protection device 106. Different sensors 120 may be used for different portions of system 100. For example, sensors 120 in first tier 110 may be different than sensors 120 in second tier 112. Each sensor 120 generates a signal representative of the measured or detected current (hereinafter referred to as "current signal") flowing through an associated trip mechanism 122 and/or circuit protection device 106. In addition, each sensor 120 transmits the current signal to processor 124 associated with, or coupled to, trip mechanism 122. Each processor 124 is programmed to activate trip mechanism 122 to interrupt a current provided to a load 104 or an electrical distribution line or bus 108 if the current signal, and/or the current represented by the current signal, exceeds a current threshold.

Circuit protection devices 106 are communicatively coupled to each other. More particularly, circuit protection devices 106 are communicatively coupled to at least one upstream circuit protection device. In the example embodiment, circuit protection devices 106 are communicatively coupled together via communication ports in their respective trip units 118. Each trip unit 118 includes an output port 132 (also referred to as an output) and an input port 134 (also referred to as an input) configured to transmit signals to and receive signals from, other trip units 118. Each trip unit's ports 132 and 134 may be physically separate ports or may be a single physical port providing one or more virtual ports (e.g., ports 132 and 134). Port 132 or 134 of a trip unit 118 is coupled to port 134 or 132 of another trip unit 118 by one or more conductors 136. Although a single conductor 136 is shown connecting output port 132 of second circuit protection device 114 to input port 134 of first circuit protection device 114, any suitable number of conductors 136 may be used to couple ports 132 and 134. In other embodiment, conductor 136 may be replaced by other wired communication means such as fiber optic. Moreover, in some embodiments, ports 132 and 134 communicate using a wireless communication protocol without use of any conductor 136. In some embodiments ports 132 and/or 134 are bidirectional (e.g., input/output) ports.

In the example embodiment, trip mechanism 122 is a circuit breaker. An electric signal is provided to trip mechanism 122 to cause the circuit breaker to trip and interrupt the flow of current through trip mechanism 122. In other embodiments, trip mechanism 122 includes, for example, one or more other circuit breaker devices and/or arc containment devices. Exemplary circuit breaker devices include, for example, circuit switches, contact arms, and/or circuit interrupters that interrupt current flowing through the circuit breaker device to a load 104 coupled to the circuit breaker device. An exemplary arc containment device includes, for example, a containment assembly, a plurality of electrodes, a plasma gun, and a trigger circuit that causes the plasma gun to emit ablative plasma into a gap between the electrodes in order to divert energy into the containment assembly from an arc or other electrical fault that is detected on the circuit.

Each processor 124 controls the operation of a circuit protection device 106 and gathers measured operating condition data, such as data representative of a current measurement (also referred to herein as "current data"), from a sensor 120 associated with a trip mechanism 122 coupled to processor 124. Processor 124 stores the current data in a memory 126 coupled to processor 124. It should be understood that the term "processor" refers generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of the term "processor."

Memory 126 stores program code and instructions, executable by processor 124, to control circuit protection device 106. Memory 126 may include, but is not limited to only include, non-volatile RAM (NVRAM), magnetic RAM (MRAM), ferroelectric RAM (FeRAM), read only memory (ROM), flash memory and/or Electrically Erasable Programmable Read Only Memory (EEPROM). Any other suitable magnetic, optical and/or semiconductor memory, by itself or in combination with other forms of memory, may be included in memory 126. Memory 126 may also be, or include, a detachable or removable memory, including, but not limited to, a suitable cartridge, disk, CD ROM, DVD or USB memory.

Input device 128 receives input from, for example, a user, another trip unit 118, a remote computing device, etc. Input device 128 may include, for example, a keyboard, a card reader (e.g., a smartcard reader), a pointing device, a mouse, a stylus, a touch sensitive panel (e.g., a touch pad or a touch screen), a gyroscope, an accelerometer, a position detector, a keypad, a communications port, one or more buttons, and/or an audio input interface. A single component, such as a touch screen, may function as both display device 130 and input device 128. In some embodiments, input device 128 may include a communication interface to receive input from a remote computing device (including from another trip unit 118). Although a single input device 128 is shown, a trip unit 118 may include more than one input device 128 or no input device 128.

Display device 130 visually presents information about circuit protection device 106 and/or trip mechanism 122. Display devices 130 may include a vacuum fluorescent display (VFD), one or more light-emitting diodes (LEDs), liquid crystal displays (LCDs), cathode ray tubes (CRT), plasma displays, and/or any suitable visual output device capable of visually conveying information to a user. For example, processor 124 may activate one or more components of display device 130 to indicate that circuit protection device 106 and/or trip mechanism 122 is active and/or operating normally, is receiving a blocking signal, is transmitting a blocking signal, that a fault or failure has occurred, and/or any other status of trip mechanism 122 and/or circuit protection device 106. In some embodiments, display device 130 presents a graphical user interface (GUI) to a user for interaction between the user and circuit protection device 106. The GUI permits the user, for example, to control circuit protection device 106, monitor operation/status of circuit protection device 106, test operation of circuit protection device 106, and/or modify operational parameters of circuit protection device 106.

System 100 is zone selective interlocking (ZSI) system. In the example embodiment, trip unit 118 of the downstream circuit protection device 106, e.g., second circuit protection device 116, includes a ZSI unit 140 as described further below. In general, downstream circuit protection devices 106 output, via output port 132, a blocking signal to upstream circuit protection devices 106 when the amount of current detected by the downstream circuit protection device 106 exceeds a blocking threshold. The blocking threshold is typically less than the tripping threshold at which the downstream circuit protection device 106 trips. In response to receiving a blocking signal, the upstream circuit protection device 106 may shift from an unrestrained mode of operation to a restrained mode of operation, to prevent the upstream and downstream circuit protection devices 106 from operating at similar trip timing sequences. Additionally or alternatively, the upstream circuit protection device 106 may switch to operating at, or using, a higher trip threshold, such as switching from a protective threshold to a backup threshold, in response to receiving a blocking signal from a downstream circuit protection device 106.

In some embodiments, in the unrestrained mode of operation, an unrestrained trip timing sequence may be executed that includes accumulating time values in which the current exceeds the protective threshold until an unrestrained time threshold is reached. In the restrained mode of operation, a restrained trip timing sequence may be executed that includes accumulating time values in which the current exceeds the backup threshold until a restrained time threshold is reached. If the restrained time threshold or the unrestrained time threshold is reached, trip unit 118 generates trip signal. Alternatively, the unrestrained trip timing sequence and the restrained trip timing sequence may include any other actions or responses that enable trip units 118 to function as described herein. It should be recognized that the unrestrained trip timing sequence causes a trip signal to be generated in a period of time that is shorter than a period of time in which the restrained trip timing sequence causes a trip signal to be generated.

In the example embodiment, ZSI unit 140 is configured to output a blocking signal when the monitored current through second circuit protection device 116 is greater than a threshold value, such as a ZSI blocking threshold. In some embodiments, the ZSI blocking threshold current is less than the current needed to trip the trip mechanism 122. In response to the blocking signal, upstream first circuit protection device 114 recognizes that second circuit protection device 116 is functioning and trip mechanism 122 will interrupt the flow of current during a downstream fault. In response, trip unit 118 of upstream first circuit protection device 114 is configured to operate in a restrained mode of operation. The restrained mode of operation may reduce the risk of first circuit protection device 114 tripping before second circuit protection device 116 during a downstream fault, also referred to as a "nuisance trip". If first circuit protection device 114 trips, other downstream second circuit protection devices 116 coupled to first circuit protection device 114 are interrupted and current will not flow to any loads coupled to circuit protection devices 116.

If the communicative connection between first and second circuit protection devices 114, 116 is damaged or disconnected, the blocking signal may not be received by first circuit protection device 114. In the example embodiment, ZSI unit 140 is configured to self-monitor the status of the communicative connection between input port 134 of upstream first circuit protection device 114 and output port 132 of downstream second circuit protection device 116. For example, ZSI unit 140 may detect the connection between circuit protection devices 106 is disconnected and provides a status indicator to notify a user of the problem. Additionally, ZSI unit 140 is configured to monitor the status of the connection such that monitoring the connection does not significantly affect the first signal and the first circuit protection device does not recognize a false first signal.

Figure 2:
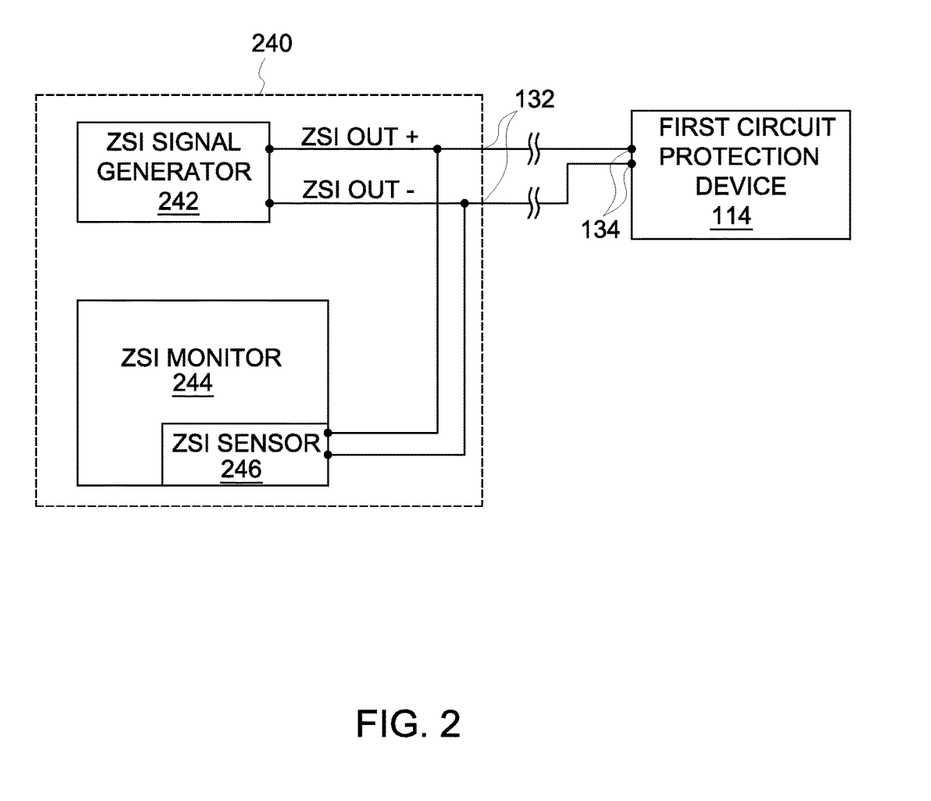
FIG. 2 is a schematic block diagram of a portion of the power distribution system in FIG. 1 including an exemplary zone selective interlock (ZSI) unit.

FIG. 2 is an example self-monitoring ZSI unit 240 that may be used as ZSI unit 140 in a power distribution system such as system 100 shown in FIG. 1. ZSI unit 240 includes the output port 132, a ZSI signal generator 242, and a ZSI monitor 244. ZSI monitor 244 includes a ZSI sensor 246. In some embodiments, ZSI unit 240 may include more or fewer components. In other embodiments, the components of ZSI unit 240 may be configured separately, e.g., ZSI monitor 244 and ZSI sensor 246 may be separated. Output port 132 outputs a "ZSI Out+" signal and a "ZSI Out−" signal that are collectively referred to as a "ZSI Out" signal (i.e., a blocking signal) to the corresponding input port 134 of first protection device 114. In other embodiments, output port 132 may output any number of signals.

ZSI signal generator 242 generates the ZSI Out signal. In some embodiments, ZSI signal generator 242 includes at least one voltage or current source (not shown in FIG. 2) coupled to output port 132. In the example embodiment, ZSI signal generator 242 is configured to generate the blocking signal in response to a trip event such as a high current detected by sensor 120 (shown in FIG. 1) to block upstream first circuit protection device 114 as described above. In the example embodiment, ZSI unit 240 is an active-low device. The absence of a signal from ZSI signal generator 242 at upstream first circuit protection device 114 is the blocking signal. During normal operation, when no blocking signal is to be transmitted, the ZSI Out+signal has a higher potential (i.e., voltage) than the ZSI Out−signal. First circuit protection device 114 or second circuit protection device 116 may supply the voltage for the ZSI Out+signal. When a blocking signal is requested, ZSI generator 242 couples the ZSI Out+signal to the ZSI Out−signal to reduce the voltage difference to substantially zero. Alternatively, ZSI unit 240 may be an active-high device, in which ZSI signal generator 242 sends a blocking signal to block the upstream first circuit protection device by applying a voltage to the ZSI Out+signal.

ZSI sensor 246 is coupled to the output of ZSI signal generator 242 to monitor the connection between output port 132 and first circuit protection device 114. In some embodiments, ZSI sensor 246 may include a plurality of ZSI sensors 246 to monitor ZSI unit 240. ZSI sensor 246 may be any type of sensor such as a voltage sensor, a current sensor, etc. In the example embodiment, ZSI sensor 246 is a voltage sensor (e.g., a resistor) observing the output of ZSI signal generator 242 as described below. As used herein, the data produced by ZSI sensor 246 is referred to as "sensor data". ZSI sensor 246 is configured to monitor the output of ZSI signal generator 242 such that an improper connection between ZSI unit 240 and first circuit protection device 114 produces sensor data different than sensor data from a properly connected ZSI unit 240 operating normally. Moreover ZSI sensor 244 is configured to produce sensor data whether the blocking signal is sent or not sent in a properly connected ZSI unit 240. As described further below, if the blocking signal is not detected by ZSI sensor 246 when generated by ZSI signal generator 242, the sensor data may indicate ZSI signal generator 242 is faulty, or that the connection between ZSI unit 240 and first circuit protection device 114 may be disconnected or require maintenance. In some embodiments, ZSI sensor 246 selectively monitors the output of ZSI signal generator 242. ZSI sensor 246 may be configured to monitor the output manually when selected by a user, periodically, or according to any other selective monitoring schedule. Alternatively, ZSI sensor 246 may continuously monitor the output of ZSI signal generator 242 while ZSI monitor 244 selectively samples the sensor data.

ZSI monitor 244 is communicatively coupled to ZSI sensor 246. In some embodiments, ZSI monitor 244 includes ZSI sensor 246. ZSI monitor 244 is configured to selectively monitor ZSI sensor 246. Alternatively, ZSI monitor 244 may be configured to continuously monitor ZSI sensor 246. In the example embodiment, ZSI monitor 244 may be implemented at least partially by processor 124. Alternatively, ZSI monitor 244 may be implemented fully or partially by a processor or microcontroller separate from processor 124.

ZSI monitor 244 is configured to examine the sensor data from ZSI sensor 246. In the example embodiment, ZSI monitor 244 monitors the voltage across ZSI sensor 246. A first voltage at ZSI sensor 246 indicates a blocking signal is not being sent and ZSI unit 240 is connected to first circuit protection device 114. A second voltage at ZSI sensor 246 indicates a blocking signal, a faulty power source, or an improper or disconnected connection between ZSI signal generator 242 and first circuit protection device 114. The first voltage is different than the second voltage. In the example embodiment, the first voltage is greater than the second voltage and the second voltage is a substantially zero volts. In other embodiments, the first voltage may be less than the second voltage and/or the first voltage may be substantially zero volts. If ZSI monitor 244 determines the sensor data indicates an improper or disconnected connection, ZSI monitor 244 generates a warning that the power distribution system may need maintenance. When ZSI monitor 244 detects sensor data from ZSI sensor 246 indicating a blocking signal has been generated, ZSI monitor 244 determines if a blocking signal should have been sent to first circuit protection device 114 as described further below. Additionally, ZSI monitor 244 may be configured to determine the duration of a blocking signal. Determining the duration enables ZSI monitor 244 to identify sensor data indicating both the blocking signal and maintenance issues, such as ZSI signal generator 242 generating too short or too long of a blocking signal or the connection between circuit protection devices 106 becoming damaged during a blocking signal.

In the exemplary embodiment, ZSI monitor 244 generates a status indicator including the warning. The status indicator represents the current status of the connection between ZSI unit 240 and first circuit protection device 114. The status indicator may be transmitted to a display device such as display device 130 (shown in FIG. 1), a device remote from circuit protection devices 106, or any other visual or audio means to indicate to a user the status of the connection between ZSI unit 240 and first circuit protection device 114. In some embodiments, the status indicator includes information such as a timestamp, a sample of the sensor data, and the location of the warning if any. In other embodiments, the status indicator includes a general status of one or more connections (e.g., normal operation, issue detected, blocking signal sent, etc.). The status indicator may be transmitted based on a request, a time schedule (i.e., periodically), or manually in the power distribution system. In some embodiments, the status indicator may be stored with a plurality of past status indicators as a historical database for the circuit protection devices.

In some embodiments, ZSI monitor 244 and ZSI sensor 246 cause some current to flow between first circuit protection device 114 and ZSI unit 240. ZSI monitor 244 and ZSI sensor 246 are configured such that the magnitude of the current flowing through ZSI monitor 244 and/or ZSI sensor 246 is less than the current magnitude of the ZSI Out signal between ZSI signal generator 242 and first circuit protection device 114. Accordingly, the current flowing through ZSI monitor 244 and ZSI sensor 246 does not substantially affect the ZSI Out signal and first circuit protection device 114 does not detect the current as a blocking signal.

Figure 3:
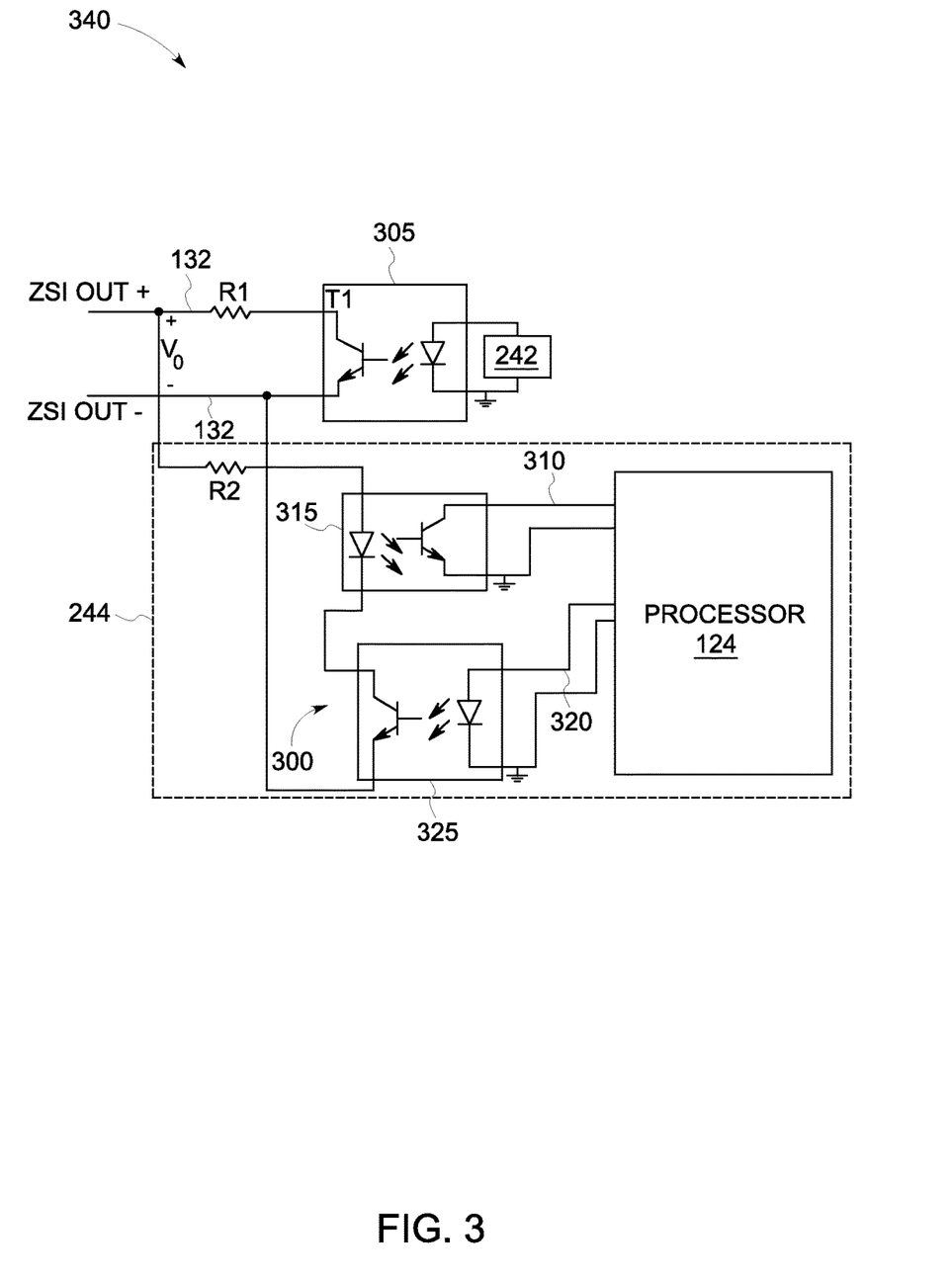
FIG. 3 is a schematic block diagram of an exemplary ZSI unit for use in the power distribution system shown in FIG. 1.

FIG. 3 is an example schematic of another ZSI unit 340 for use in a power distribution system such as the system 100 shown in FIG. 1. Except as otherwise described, ZSI unit 340 operates similar to ZSI unit 240 shown in FIG. 2 and includes similar components using the same reference numbers. In the example embodiment, ZSI unit 340 sends an active low blocking signal to first circuit protection device 114 shown in FIG. 1. A first voltage is applied at first circuit protection device 114 when no blocking signal is sent by ZSI unit 340. To send a blocking signal to first circuit protection device 114, ZSI unit 340 causes a second voltage lower than the first voltage (e.g., substantially zero volts) to be applied to first circuit protection device 114. First circuit protection device 114 is configured to detect the second voltage as a blocking signal and begin a restrained mode of operation. In other embodiments, ZSI unit 340 may be configured to operate as an active-high device.

ZSI signal generator 242 is coupled to an optocoupler 305. In the example embodiment, ZSI signal generator 242 sends a blocking signal by supplying a current to optocoupler 305 to close switch T1. Optocoupler 305 connects the ZSI Out+signal and the ZSI Out−signal to reduce a voltage difference $V_o$ between the ZSI Out signals. First circuit protection device 114 detects the reduced voltage difference $V_o$ as a blocking signal. In the exemplary embodiment, ZSI monitor 244 and ZSI sensor 246 (shown in FIG. 2) are at least partially implemented in processor 124. ZSI unit 340 is a "pulse to test" configuration with a selective test circuit 300. Selective test circuit 300 includes an optocoupler 325 configured to selectively allow current to flow between output port 132 and ZSI monitor 244. In other embodiments, selective test circuit 300 may include any components for selectively coupling ZSI sensor 246 and ZSI monitor 244 to ZSI signal generator 242 and/or output port 132.

Selective test circuit 300 is coupled to an optocoupler 315 and output port 132. Selective test circuit 300 is further coupled to processor 124 and a selective output 320. Selective test circuit 300 is configured to control current flow to ZSI monitor 244 from output port 132. Selective output 320 provides signals to control optocoupler 315 to selectively couple current from output port 132 to ZSI monitor 244.

The ZSI monitor 244 includes processor 124, an optocoupler 315, a test input 310 for providing a test signal from optocoupler 315 to processor 124, and selective test circuit 300. The test signal enables ZSI monitor 244 to detect blocking signals and improper connections to output port 132. The test signal may be any type of signal the processor 124 is configured to detect. Optocoupler 315 is configured to control the test signal based on selective test circuit 300 and the voltage difference $V_o$ between the ZSI Out+signal and the ZSI Out−signal. When selective test circuit 300 is not coupling current from output port 132 to ZSI monitor 244 (i.e., when it is not testing), no current flows through the diode of optocoupler 315, and no test signal is generated on test input 310. When testing is selected by selective test circuit 300, current can flow between output port 132 and optocouplers 315 and 325. If the voltage difference $V_o$ is greater than a threshold voltage, optocoupler 315 provides the test signal to test input 310. The threshold voltage is a voltage that corresponds to the voltage difference $V_o$ being substantially the first voltage applied at first circuit protection device 114 when no blocking signal is sent by ZSI unit 340. When the voltage difference $V_o$ is less than the threshold voltage (e.g., zero volts), optocoupler 315 does not provide the test signal to test input 310. In other embodiments, the test signal may be generated by any other suitable method. Processor 124 is configured to detect whether the test signal is present on test input 310. In the example embodiment, the test signal is an active-low signal, and connection of test input 310 to ground is a test signal indicating a blocking signal is being sent or that there is a connection issue between output port 132 and first circuit protection device 114. Alternatively, the test signal may be an active-high signal that identifies a blocking signal or an improper or disconnected connection between the two circuit protection devices 106 by disconnecting test input 310 from ground. In other embodiments, the test signal and optocoupler 315 may be configured in alternate configurations to monitor the ZSI Out signal.

To monitor the ZSI Out signals, ZSI monitor 244 outputs the first voltage at selective output 320 to cause selective test circuit 300 to connect output port 132 and optocoupler 215. ZSI monitor 244 may be configured to output the first voltage at selective output 320 based on a user's input, a periodic interval, or according to any other method to select a monitoring frequency. ZSI monitor 244 may determine or receive a request to not monitor the ZSI Out signals. ZSI monitor 244 then outputs the second voltage at selective output 320 to disconnect selective test circuit 300 and prevent current flowing from output port 132 to optocoupler 315. In other embodiments, ZSI monitor 244 may be configured in alternative configurations to selectively prevent current from output port 132 to flow to ZSI sensor 246 while ZSI monitor 244 is not monitoring the ZSI Out signals. In some embodiments, ZSI monitor 244 continues to monitor the ZSI Out signals but does not generate a status indicator.

Figure 4:
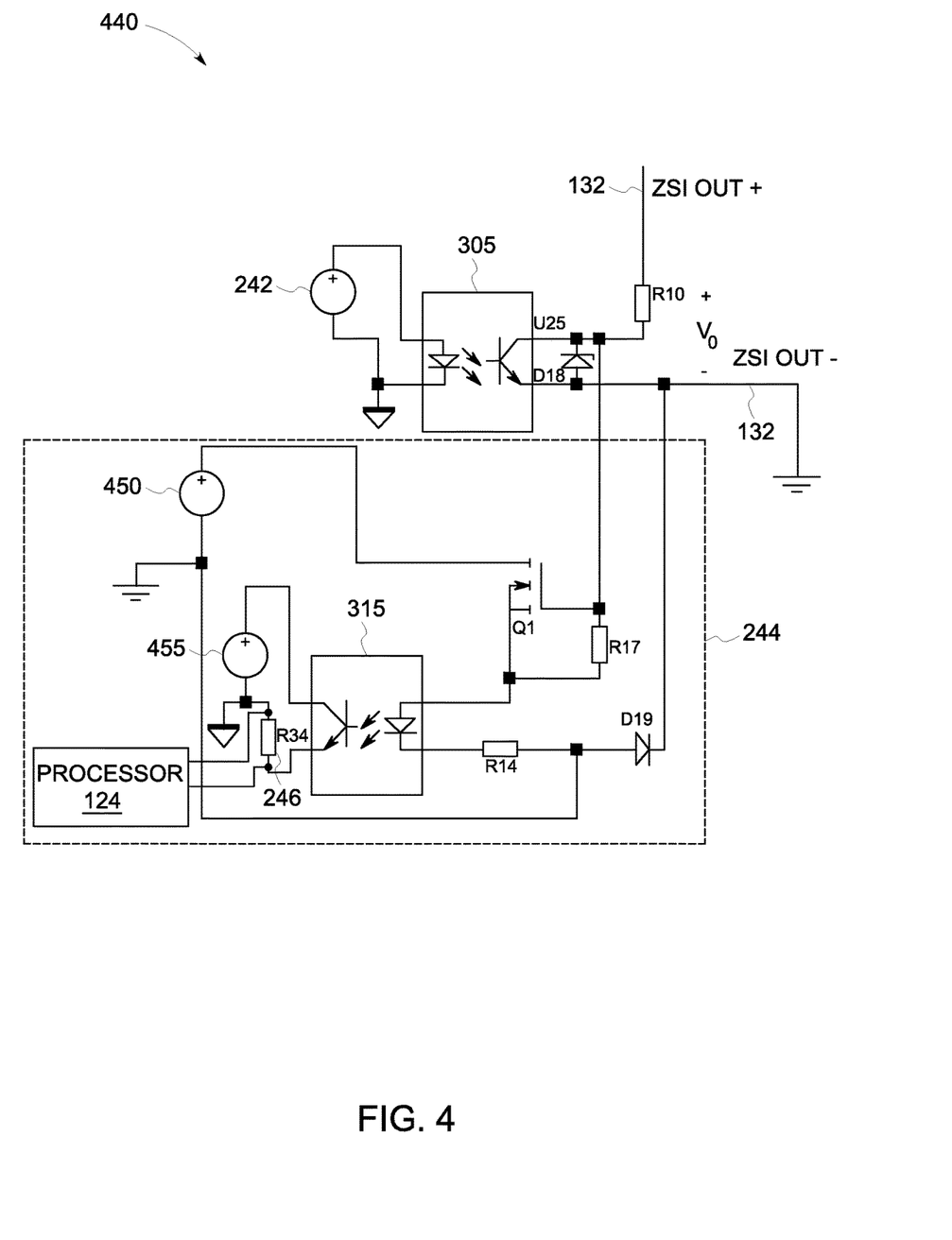
FIG. 4 is a circuit diagram of another exemplary ZSI unit for use in the power distribution system shown in FIG. 1.

FIG. 4 is an example circuit diagram of a ZSI unit 440 that may be used in a power distribution system such as system 100. Except as otherwise described, ZSI unit 440 operates similar to ZSI units 240, 340 shown in FIGS. 2 and 3 and includes similar components using the same reference numbers. In the exemplary embodiment, ZSI unit 440 includes processor 124, output port 132, ZSI signal generator 242, ZSI monitor 244, and optocoupler 305. ZSI monitor 244 further includes ZSI sensor 246, optocoupler 315, selective output source 450, and a test signal source 455.

ZSI signal generator 242 is coupled to ZSI unit 440 via optocoupler 305 and is configured to transmit a blocking signal to an upstream circuit protection device, e.g., first circuit protection device 114 shown in FIG. 1. In the example embodiment, ZSI signal generator 242 is configured to send an active-low blocking signal to the upstream circuit protection device by coupling the ZSI Out+signal to the ZSI Out−signal to reduce the voltage difference $V_o$ between the ZSI Out signals to substantially zero. ZSI sensor 246 is a resistor R34 configured as a voltage sensor. Processor 124 is coupled to ZSI sensor 246 to monitor the voltage across ZSI sensor 246. ZSI sensor 246 is coupled to optocoupler 315 and test signal source 455.

ZSI monitor 244 is coupled to output port 132. A diode D19 is configured to facilitate unidirectional current from the ZSI Out signals and ZSI monitor 244. A resistor R17 draws current from the ZSI Out+signal to a switch Q1. Resistor R17 is sized such that the drawn current is significantly less than the ZSI Out signals and the drawn current generally flows to the switch Q1. Switch Q1 connects or disconnects selective output source 450 to optocoupler 315 based on the ZSI Out+signal. Selective output source 450 is similar to selective test circuit 300 and selective output 320 shown in FIG. 3. Selective output source 450 enables a user to selectively monitor the connection between ZSI unit 440 and the upstream circuit protection device 106 by changing the magnitude of the signal generated. In the example embodiment, selective output source 450 is configured to output a DC signal to optocoupler 315. In other embodiments, the selective output source may be configured to output an alternative signal (e.g., an AC signal) to connect optocoupler 315.

When a blocking signal is not being sent by ZSI signal generator 242 and there are no connection issues, switch Q1 enables the DC signal from selective output source 450 to flow to optocoupler 315. In response, optocoupler 315 couples ZSI sensor 246 to test signal source 455 to produce a first voltage across ZSI sensor 246. When a blocking signal is sent, the voltage difference $V_o$ between the ZSI Out signals is reduced to substantially zero. Switch Q1 disconnects selective output source 450 from optocoupler 315. In response, optocoupler 315 disconnects ZSI sensor 246 from test signal source 455 to produce a second voltage less than the first voltage (e.g., zero volts) across ZSI sensor 246. Processor 124 is configured to monitor ZSI sensor 246 to detect whether the first or second voltage is across ZSI sensor 246. Additionally, ZSI unit 440 is configured such that a failure in ZSI signal generator 242, or an improper connection of the ZSI Out+signal or the ZSI Out−signal may produce sensor data similar to the blocking signal. For example, if the ZSI Out+signal is misconnected and has a substantially zero voltage relative to the ZSI Out−signal, switch Q1 does not connect control source 450 to optocoupler 315. Optocoupler 315 does not connect test signal source 455 to ZSI sensor 246, resulting in sensor data indicating the second voltage at ZSI sensor 244. In some embodiments, ZSI monitor 244 is configured to identify what component caused the warning.

Figure 5:
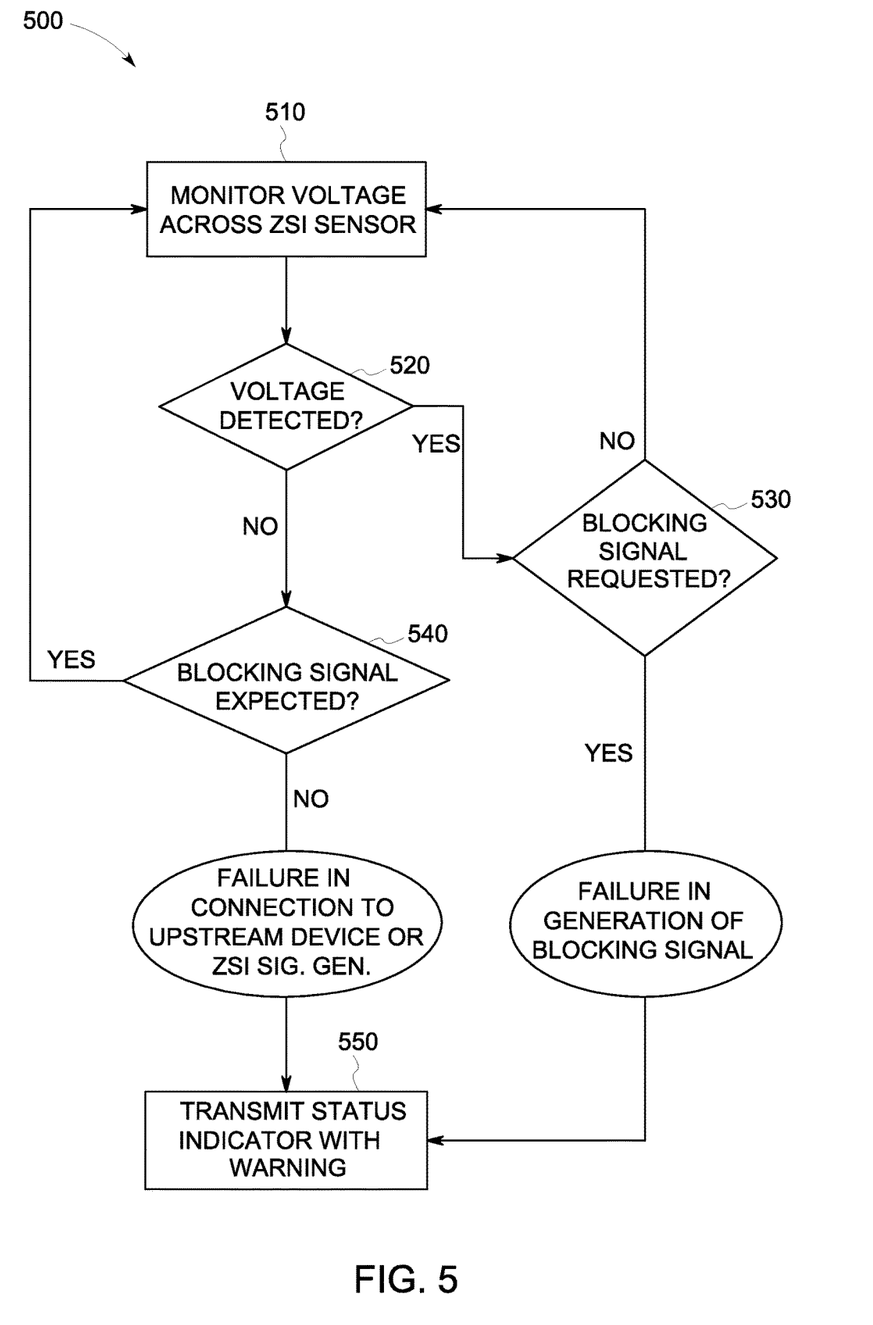
FIG. 5 is a flow diagram of an exemplary method for monitoring a power distribution system such as the system shown in FIG. 1.

FIG. 5 is an example method 500 of monitoring a power distribution system such as the system 100. The power distribution system includes a plurality of circuit protection devices arranged in an upstream/downstream configuration with a ZSI system. The method 500 in particular monitors a connection between a ZSI unit including a ZSI signal generator, a ZSI sensor, and a ZSI monitor of a downstream circuit protection device and an input port of an upstream circuit protection device. The ZSI signal generator is configured to transmit a blocking signal to the upstream circuit protection device via the connection. In the example embodiment, the ZSI system is an active-low system The ZSI monitor begins by monitoring 510 the voltage across the ZSI sensor. In other embodiments, the ZSI monitor monitors 510 different data from the ZSI sensor such as, but not limited to, current data, power data, and thermal data. The ZSI monitor may monitor 510 the voltage across the ZSI sensor continually, periodically, or any other defined monitoring frequency (e.g., manually defined) until the ZSI monitor detects 520 a voltage across the ZSI sensor different than the voltage across the ZSI sensor during normal operation. In other embodiments, the ZSI monitor may detect any change in the sensor data from the ZSI sensor.

If the voltage is detected, the ZSI monitor determines 530 whether or not a blocking signal was requested. If the ZSI monitor determines 530 no blocking signal was requested, the monitor should detect the voltage, the system is functioning properly, and the ZSI monitor continues to monitor 510 the voltage across the ZSI sensor. If the ZSI monitor determines 530 the blocking signal was requested, the voltage detected across the ZSI sensor may indicate that the ZSI unit has failed to generate the blocking signal and may not be functioning properly. The ZSI monitor then transmits 550 a status indicator with a warning to be examined by a user. In some embodiments, the ZSI monitor may transmit 550 the status indicator to a remote device or a display device.

If the ZSI monitor does not detect 520 the voltage across the ZSI sensor or if the voltage is different than the voltage during normal operation, the voltage may indicate that a blocking signal was sent to the upstream circuit protection device or that there is a problem with the connection between the circuit protection devices. The ZSI monitor determines 540 if a ZSI blocking signal was expected. In the example embodiment, the ZSI monitor checks whether a request for the blocking signal was sent. If a request for the blocking signal was sent, the lack of voltage confirms that the blocking signal was properly sent and the ZSI monitor begins to monitor 510 the ZSI sensor voltage again. In some embodiments, the ZSI monitor may determine if the duration of the blocking signal is within an expected range. If the duration of the blocking signal is outside of an expected range, the lack of voltage across the ZSI sensor may be indicating a maintenance issue. If the ZSI monitor determines 540 a blocking signal is not expected, the lack of voltage indicates there is a problem with the connection between the circuit protection devices and the ZSI monitor transmits 550 a status indicator with a warning to be examined by the user.

The systems and methods described above for monitoring a ZSI network in a power distribution system with circuit protection devices enable the power distribution system to self-monitor the ZSI network without requiring external monitoring devices or interrupting the ZSI network capabilities (i.e., the blocking signals are not interrupted and false blocking signals are not generated by monitoring). By providing a visual and/or audio status indicator with a warning to a user of the power distribution system, the user is notified of connection issues between the circuit protection devices. Additionally, the monitoring unit of the circuit protection devices is configured to selectively monitor the ZSI network to enable the user to control the frequency of tests.

A technical effect of the methods and systems described herein may include one or more of: (a) monitoring a status of a communicative connection between a ZSI output port of a downstream circuit protection device and a ZSI input port of an upstream circuit protection device with a ZSI monitor of the downstream protection device; (b) detecting whether the ZSI output port of the downstream circuit protection device is coupled to the ZSI input port of the upstream circuit protection device; and (c) indicating a status of the connection.

Exemplary embodiments of power distribution systems and methods of operating a power distribution system are described above in detail. The systems and methods are not limited to the specific embodiments described herein but, rather, components of the systems and/or operations of the methods may be utilized independently and separately from other components and/or operations described herein. Further, the described components and/or operations may also be defined in, or used in combination with, other systems, methods, and/or devices, and are not limited to practice with only the power system as described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A circuit protection device comprising:
   a trip mechanism configured to interrupt a current flowing through said circuit protection device; and
   a trip unit operatively coupled to said trip mechanism, said trip unit comprising:
   a zone selective interlock (ZSI) signal generator;
   a ZSI output port coupled to said ZSI signal generator and configured for a communicative connection to a ZSI input port of a second circuit protection device; and
   a ZSI monitor coupled to said ZSI output port and configured to selectively monitor a status of the communicative connection between said ZSI output port and said ZSI input port of said second circuit protection device by selectively permitting electrical current to flow between said ZSI output port and said ZSI monitor.

2. A circuit protection device in accordance with claim 1, wherein said ZSI monitor is configured to detect whether said ZSI output port is coupled to said ZSI input port of said second circuit protection device.

3. A circuit protection device in accordance with claim 2, wherein said ZSI monitor is configured to detect when a ZSI signal is output by said ZSI signal generator through said ZSI output port.

4. A circuit protection device in accordance with claim 1, wherein said ZSI monitor is configured to provide an indication of the status of the communicative connection.

5. A circuit protection device in accordance with claim 4, further comprising a display, wherein said ZSI monitor is configured to provide the indication of the status of the communicative connection via said display.

6. A circuit protection device in accordance with claim 4, wherein said ZSI monitor is configured to provide the indication of the status of the communicative connection by transmitting an indication to a device remote from said circuit protection device.

7. A circuit protection device in accordance with claim 1, wherein said ZSI signal generator is configured to produce a first current between a ZSI input port of a second circuit protection device and said ZSI output port, said ZSI monitor is configured to produce a second current between the ZSI input port of the second circuit protection device and said ZSI output port, and the second current has a magnitude less than the first current.

8. A power distribution system comprising:
   a first circuit protection device comprising a zone selective interlock (ZSI) input port; and
   a second circuit protection device coupled to said first circuit protection device downstream of said first circuit protection device, said second circuit protection device comprising:
   a trip mechanism configured to interrupt a current flowing through said second circuit protection device; and
   a trip unit operatively coupled to said trip mechanism, said trip unit comprising:
   a ZSI signal generator;
   a ZSI output port coupled to said ZSI signal generator and configured for a communicative connection to said ZSI input port of said first circuit protection device; and
   a ZSI monitor coupled to said ZSI output port and configured to selectively monitor a status of the communicative connection between said ZSI output port and said ZSI input port of said first circuit protection device by selectively permitting electrical current to flow between said ZSI output port and said ZSI monitor.

9. A power distribution system in accordance with claim 7, further comprising a ZSI conductor coupled between said ZSI input port and said ZSI output port to communicatively connect said ZSI output port to said ZSI input port.

10. A power distribution system in accordance with claim 7, wherein said ZSI monitor is configured to detect whether said ZSI output port is coupled to a ZSI input port of a second circuit protection device.

11. A power distribution system in accordance with claim 10, wherein said ZSI monitor is configured to detect when a ZSI signal is output by said ZSI signal generator through said ZSI output port.

12. A power distribution system in accordance with claim 8, wherein said ZSI monitor is configured to provide an indication of the status of the communicative connection.

13. A power distribution system in accordance with claim 12, wherein said second circuit protection device further comprises a display, wherein said ZSI monitor is configured to provide the indication of the status of the communicative connection via said display.

14. A power distribution system in accordance with claim 12, wherein said ZSI monitor is configured to provide the indication of the status of the communicative connection by transmitting an indication to a device remote from said circuit protection device.

15. A power distribution system in accordance with claim 8, wherein said ZSI signal generator is configured to produce a first current between a ZSI input port of said first circuit protection device and said ZSI output port, said ZSI monitor is configured to produce a second current between the ZSI input port of said first circuit protection device and said ZSI output port, and the second current has a magnitude less than the first current.

16. A method of monitoring a power distribution system with a plurality of circuit protection devices comprising a trip unit with zone selective interlock (ZSI), said method comprising:
   selectively monitoring a status of a communicative connection between a ZSI output port of a first circuit protection device and a ZSI input port of a second circuit protection device with a ZSI monitor of the first circuit protection device by selectively permitting electrical current to flow between the ZSI output port of the first circuit protection device and the ZSI monitor;
   detecting whether the ZSI output port of the first circuit protection device is coupled to the ZSI input port of the second circuit protection device; and
   indicating the status of the communicative connection.

17. A method in accordance with claim 16, wherein indicating the status of the communicative connection includes generating an indication representing the status of the communicative connection.

18. A method in accordance with claim 17 further comprising:
   displaying the indication on a display.

19. A method in accordance with claim 17 further comprising:
   transmitting the indication to a device remote from the first and second circuit protection devices.

20. A method in accordance with claim 16 further comprising:
   producing a first current between the ZSI input port of the second circuit protection device and the ZSI output port of the first circuit protection device, wherein the ZSI monitor is configured to produce a second current between the ZSI input port of the second circuit protection device and the ZSI output port of the first circuit protection device, and the second current has a magnitude less than the first current.

* * * * *